United States Patent [19]

Yamada

[11] 4,285,579
[45] Aug. 25, 1981

[54] COPYING LENS SYSTEM

[75] Inventor: Yu Yamada, Kokubunji, Japan

[73] Assignee: Canon Kabushiki Kaisha, Tokyo, Japan

[21] Appl. No.: 99,892

[22] Filed: Dec. 3, 1979

[30] Foreign Application Priority Data

Dec. 15, 1978 [JP] Japan .................... 53-156105

[51] Int. Cl.³ .............................. G02B 9/36
[52] U.S. Cl. ..................................... 350/470
[58] Field of Search ........................... 350/221

[56] References Cited

U.S. PATENT DOCUMENTS 2,405,729  8/1946  Altman ................... 350/221
3,731,990  5/1973  Van Orden ............. 350/221

FOREIGN PATENT DOCUMENTS 143841   8/1903  Fed. Rep. of Germany ........... 350/221
346029   2/1921  Fed. Rep. of Germany ........... 350/221
1163045  2/1964  Fed. Rep. of Germany ........... 350/221

Primary Examiner—John K. Corbin
Assistant Examiner—Scott J. Sugarman
Attorney, Agent, or Firm—Fitzpatrick, Cella, Harper & Scinto

[57] ABSTRACT

A copying lens system having four lenses disposed symmetrically about a diaphragm is characterized in that it has an F-number of 5 to 6, has a half angle of view of 15° to 18° and is good in spherical aberration, field curvature and astigmatic difference.

9 Claims, 3 Drawing Figures

COPYING LENS SYSTEM

BACKGROUND OF THE INVENTION

1. Field of the Invention

This invention relates to a copying lens system suited for copying at a magnification in the vicinity of one-to-one magnification.

2. Description of the Prior Art

Heretofore, a lens system used for copying has usually comprised six to eight lenses disposed symmetrically about a diaphragm with the brightness and aberrations thereof taken into account. In the copying lens system of such construction, if the number of lenses forming the lens system is reduced to reduce the cost thereof and make the system compact, the brightness and aberrations are remarkably deteriorated. For example, if the lens system is formed by four lenses, F-number in such lens system comprising lenses disposed symmetrically about a diaphragm exceeds 9 as known in DAS No. 11 63 045, and the spherical aberration, etc. become greater.

German Patent No. 346029 (published on Dec. 23, 1921) discloses a four-lens lens system having an F-number of 4.5, but the present invention provides a copying lens system in which aberrations are further improved.

SUMMARY OF THE INVENTION

It is the object of the present invention to provide a compact copying lens system which comprises four lenses disposed symmetrically about a diaphragm and in which F-number is 5 to 6, the half angle of view is 15° to 18° and spherical aberration, field curvature and astigmatic difference are reduced.

Such object is achieved by disposing a first biconvex positive lens, a first biconcave negative lens, a diaphragm, a second biconcave negative lens and a second biconvex positive lens in the named order from the object side and by causing these lenses to satisfy the following conditions:

$$0.298F < f_1 < 0.378F \tag{1}$$

$$-0.41F < f_2 < -0.312F \tag{2}$$

$$1.54 < r_2/r_3 < 2.38 \tag{3}$$

$$0.064 < N_1 - N_2 < 0.146 \tag{4}$$

where
 F: the focal length of the entire lens system
 $f_1$: the focal length of the first and second biconvex positive lenses
 $f_2$: the focal length of the first and second biconcave negative lenses
 $r_2/r_3$: the ratio of curvature radii of the adjacent surfaces of the biconvex positive lens and the biconcave negative lens
 $N_1 - N_2$: difference between the refractive index of the biconvex positive lens and the refractive index of the biconcave negative lens.

The invention will become fully apparent from the following detailed description thereof taken in conjunction with the accompanying drawings.

DESCRIPTION OF THE PREFERRED EMBODIMENTS

Figure 1:
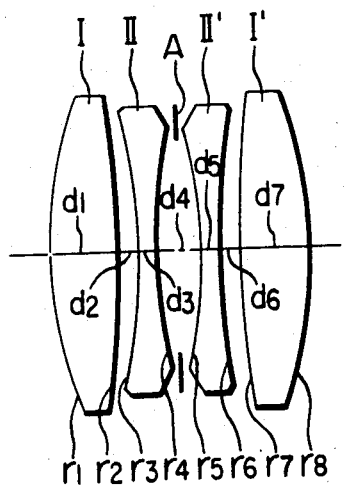
FIG. 1 is a cross-sectional view of the copying lens system according to the present invention.

As shown in FIG. 1, the lens system of the present invention comprises four lenses, of which biconvex positive lenses I and I' are equal lenses and biconcave negative lenses II and II' are equal lenses. These lenses are disposed symmetrically about a diaphragm A and satisfy the following conditions:

$$0.298F < f_1 < 0.378F \tag{1}$$

$$-0.41F < f_2 < -0.312F \tag{2}$$

$$1.54 < r_2/r_3 < 2.38 \tag{3}$$

$$0.064 < N_1 - N_2 < 0.146 \tag{4}$$

where
 F: the focal length of the entire lens system
 $f_1$: the focal length of the first and second biconvex positive lenses
 $f_2$: the focal length of the first and second biconcave negative lenses
 $r_2/r_3$: the ratio of curvature radii of the adjacent surfaces of the biconvex positive lens and the biconcave negative lens
 $N_1 - N_2$: difference between the refractive index of the biconvex positive lens and the refractive index of the biconcave negative lens If the lower limit of condition (1) or the upper limit of condition (2) is exceeded, the spherical aberration will be over-corrected and it will become difficult to provide a great aperture and moreover, the meridional ring zone image plane will be under-corrected.

If the upper limit of condition (1) or the lower limit of condition (2) is exceeded, it will be advantageous for providing a great aperture but the meridional ring zone image plane will be over-corrected and the astigmatic difference will be great, thus making it difficult to provide a wide angle of view.

The lower limit of condition (3) is a condition for keeping the astigmatism well and if this lower limit is exceeded, the astigmatism will be over-corrected. On the other hand, if the upper limit of condition (3) is exceeded, the meridional ring zone image plane will be over corrected and the astigmatic difference will become great.

If the lower limit of condition (4) is exceeded, the spherical aberration will be over-corrected and the meridional ring zone image plane will be over-corrected and the astigmatic difference will become great. On the other hand, if the upper limit of condition (4) is exceeded, the meridional ring zone image plane will be under-corrected.

The data of embodiments of the lens system according to the present invention when the focal length F of the entire system is F=1 will be shown later. The biconvex positive lenses I and I' are equal lenses and the biconcave negative lenses II and II' are equal lenses, and these lenses are disposed symmetrically about the diaphragm A. Here, $r_i$ is the curvature radius of the ith lens surface as counted from the object side, di is the axial thickness or the axial air space between the ith lens surface and the i+1th lens surface, $N_i$ is the refractive index of the ith lens, and $v_i$ is the dispersion value of the ith lens.

The F-number of the lens systems of embodiments 1 to 8 is 5, and the half angle of view thereof is 15° to 18°.

Figure 2:
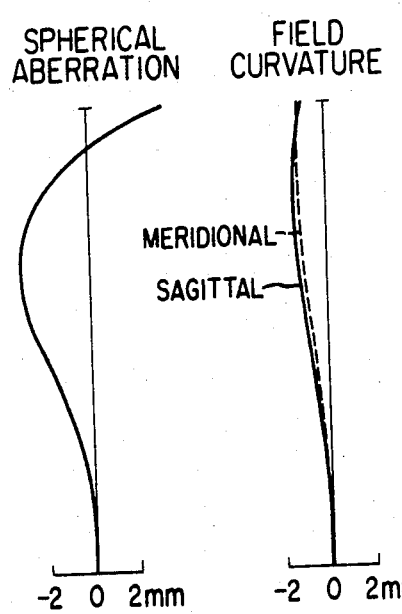
FIGS. 2 and 3 show the aberrations in embodiments of the copying lens system according to the present invention.
Figure 3:
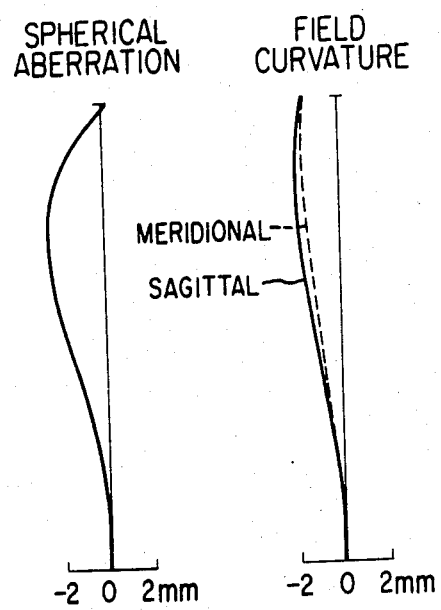

FIG. 2 shows the aberrations when the focal length of the entire system of embodiment 1 (half angle of view 15°) is F=280 mm, and FIG. 3 shows the aberrations when the focal length of the entire system of embodiment 2 (half angle of view 18°) is F=204 mm. As shown in FIGS. 2 and 3, in the lens system of the present invention comprising four lenses, the spherical aberration and field curvature are well corrected. The astigmatic difference is also well corrected.

Embodiment 1:

| | | | |
|---|---|---|---|
| $r_1 = -r_8 = 0.31691$ | | $d_1 = d_7 = 0.0544$ | |
| $r_2 = -r_7 = -0.96330$ | | $d_2 = d_6 = 0.0208$ | |
| $r_3 = -r_6 = -0.46932$ | | $d_3 = d_5 = 0.0134$ | |
| $r_4 = -r_5 = 0.41820$ | | $d_4 = 0.0276$ | |
| $N_1 = N_4 = 1.6935$ | $v_1 = v_4 = 53.2$ | $f_1 = 0.350$ | |
| | | $f_2 = -0.378$ | |
| $N_2 = N_3 = 1.58144$ | $v_2 = v_3 = 40.7$ | $r_2/r_3 = 2.053$ | |
| | | $N_1 - N_2 = 0.112$ | |

Embodiment 2:

| | | | |
|---|---|---|---|
| $r_1 = -r_8 = 0.33348$ | | $d_1 = d_7 = 0.0570$ | |
| $r_2 = -r_7 = -0.94949$ | | $d_2 = d_6 = 0.0195$ | |
| $r_3 = -r_6 = -0.48473$ | | $d_3 = d_5 = 0.0147$ | |
| $r_4 = -r_5 = 0.44655$ | | $d_4 = 0.0339$ | |
| $N_1 = N_4 = 1.6935$ | $v_1 = v_4 = 53.2$ | $f_1 = 0.363$ | |
| | | $f_2 = -0.397$ | |
| $N_2 = N_3 = 1.58144$ | $v_2 = v_3 = 40.7$ | $r_2/r_3 = 1.959$ | |
| | | $N_1 - N_2 = 0.112$ | |

Embodiment 3:

| | | | |
|---|---|---|---|
| $r_1 = -r_8 = 0.34435$ | | $d_1 = d_7 = 0.0550$ | |
| $r_2 = -r_7 = -1.07109$ | | $d_2 = d_6 = 0.0181$ | |
| $r_3 = -r_6 = -0.52128$ | | $d_3 = d_5 = 0.0260$ | |
| $r_4 = -r_5 = 0.42581$ | | $d_4 = 0.0183$ | |
| $N_1 = N_4 = 1.726$ | $v_1 = v_4 = 53.5$ | $f_1 = 0.365$ | |
| | | $f_2 = -0.399$ | |
| $N_2 = N_3 = 1.58144$ | $v_2 = v_3 = 40.7$ | $r_2/r_3 = 2.055$ | |
| | | $N_1 - N_2 = 0.145$ | |

Embodiment 4:

| | | | |
|---|---|---|---|
| $r_1 = -r_8 = 0.29039$ | | $d_1 = d_7 = 0.0544$ | |
| $r_2 = -r_7 = -0.76262$ | | $d_2 = d_6 = 0.0233$ | |
| $r_3 = -r_6 = -0.40310$ | | $d_3 = d_5 = 0.0051$ | |
| $r_4 = -r_5 = 0.41535$ | | $d_4 = 0.0377$ | |
| $N_1 = N_4 = 1.6485$ | $v_1 = v_4 = 53.$ | $f_1 = 0.331$ | |
| | | $f_2 = -0.351$ | |
| $N_2 = N_3 = 1.58144$ | $v_2 = v_3 = 40.7$ | $r_2/r_3 = 1.892$ | |
| | | $N_1 - N_2 = 0.067$ | |

Embodiment 5:

| | | | |
|---|---|---|---|
| $r_1 = -r_8 = 0.29321$ | | $d_1 = d_7 = 0.0414$ | |
| $r_2 = -r_7 = -1.03458$ | | $d_2 = d_6 = 0.0176$ | |
| $r_3 = -r_6 = -0.47557$ | | $d_3 = d_5 = 0.0107$ | |
| $r_4 = -r_5 = 0.36869$ | | $d_4 = 0.0285$ | |
| $N_1 = N_4 = 1.691$ | $v_1 = v_4 = 54.8$ | $f_1 = 0.335$ | |
| | | $f_2 = -0.364$ | |
| $N_2 = N_3 = 1.56732$ | $v_2 = v_3 = 42.8$ | $r_2/r_3 = 2.175$ | |
| | | $N_1 - N_2 = 0.124$ | |

Embodiment 6:

| | | | |
|---|---|---|---|
| $r_1 = -r_8 = 0.33271$ | | $d_1 = d_7 = 0.0548$ | |
| $r_2 = -r_7 = -1.10922$ | | $d_2 = d_6 = 0.0317$ | |
| $r_3 = -r_6 = -0.46931$ | | $d_3 = d_5 = 0.0075$ | |
| $r_4 = -r_5 = 0.50650$ | | $d_4 = 0.0398$ | |
| $N_1 = N_4 = 1.6935$ | $v_1 = v_4 = 53.2$ | $f_1 = 0.375$ | |
| | | $f_2 = -0.408$ | |
| $N_2 = N_3 = 1.59551$ | $v_2 = v_3 = 39.2$ | $r_2/r_3 = 2.364$ | |
| | | $N_1 - N_2 = 0.098$ | |

Embodiment 7:

| | | | |
|---|---|---|---|
| $r_1 = -r_8 = 0.30394$ | | $d_1 = d_7 = 0.0555$ | |
| $r_2 = -r_7 = -0.69051$ | | $d_2 = d_6 = 0.0132$ | |
| $r_3 = -r_6 = -0.44054$ | | $d_3 = d_5 = 0.0169$ | |
| $r_4 = -r_5 = 0.37475$ | | $d_4 = 0.0318$ | |
| $N_1 = N_4 = 1.72$ | $v_1 = v_4 = 43.7$ | $f_1 = 0.300$ | |
| | | $f_2 = -0.314$ | |
| $N_2 = N_3 = 1.6398$ | $v_2 = v_3 = 34.5$ | $r_2/r_3 = 1.567$ | |
| | | $N_1 - N_2 = 0.080$ | |

Embodiment 8:

-continued

| | | | |
|---|---|---|---|
| $r_1 = -r_8 = 0.31041$ | | $d_1 = d_7 = 0.0587$ | |
| $r_2 = -r_7 = -0.85931$ | | $d_2 = d_6 = 0.0123$ | |
| $r_3 = -r_6 = -0.49107$ | | $d_3 = d_5 = 0.0105$ | |
| $r_4 = -r_5 = 0.37531$ | | $d_4 = 0.0303$ | |
| $N_1 = N_4 = 1.744$ | $v_1 = v_4 = 44.7$ | $f_1 = 0.313$ | |
| | | $f_2 = -0.333$ | |
| $N_2 = N_3 = 1.63636$ | $v_2 = v_3 = 35.4$ | $r_2/r_3 = 1.750$ | |
| | | $N_1 - N_2 = 0.108$ | |

What I claim is:

1. A copying lens system comprising, in succession from the object side, a first biconvex positive lens, a first biconcave negative lens, a diaphragm, a second biconcave negative lens identical to said first biconcave negative lens, and a second biconvex positive lens identical to said first biconvex positive lens, said system satisfying the following conditions:

$$0.298F < f_1 < 0.378F$$

$$-0.41F < f_2 < -0.312F$$

$$1.54 < r_2/r_3 < 2.38$$

$$0.064 < N_1 - N_2 < 0.146$$

where
F: the focal length of the entire lens system
$f_1$: the focal length of the first and second biconvex positive lenses
$f_2$: the focal length of the first and second biconcave negative lenses
$r_2/r_3$: the ratio of curvature radii of the adjacent surfaces of the biconvex positive lens and the biconcave negative lens
$N_1 - N_2$: difference between the refractive index of the biconvex positive lens and the refractive index of the biconcave negative lens 2. A copying lens system according to claim 1, satisfying the following data:

| | | | |
|---|---|---|---|
| $r_1 = -r_8 = 0.31691$ | | $d_1 = d_7 = 0.0544$ | |
| $r_2 = -r_7 = -0.96330$ | | $d_2 = d_6 = 0.0208$ | |
| $r_3 = -r_6 = -0.46932$ | | $d_3 = d_5 = 0.0134$ | |
| $r_4 = -r_5 = 0.41820$ | | $d_4 = 0.0276$ | |
| $N_1 = N_4 = 1.6935$ | $v_1 = v_4 = 53.2$ | $f_1 = 0.350$ | |
| | | $f_2 = -0.378$ | |
| $N_2 = N_3 = 1.58144$ | $v_2 = v_3 = 40.7$ | $r_2/r_3 = 2.053$ | |
| | | $N_1 - N_2 = 0.112$ | | where $r_i$ represents the curvature radius of the ith lens surface as counted from the object side, $d_i$ represents the axial thickness or the axial air space between the ith lens surface and the i+1th lens surface, $N_i$ represents the refractive index of the ith lens, and $v_i$ represents the dispersion value of the ith lens.

3. A copying lens system according to claim 1, satisfying the following data:

| | | | |
|---|---|---|---|
| $r_1 = -r_8 = 0.33348$ | | $d_1 = d_7 = 0.0570$ | |
| $r_2 = -r_7 = -0.94949$ | | $d_2 = d_6 = 0.0195$ | |
| $r_3 = -r_6 = -0.48473$ | | $d_3 = d_5 = 0.0147$ | |
| $r_4 = -r_5 = 0.44655$ | | $d_4 = 0.0339$ | |
| $N_1 = N_4 = 1.6935$ | $v_1 = v_4 = 53.2$ | $f_1 = 0.363$ | |
| | | $f_2 = -0.397$ | |
| $N_2 = N_3 = 1.58144$ | $v_2 = v_3 = 40.7$ | $r_2/r_3 = 1.959$ | |
| | | $N_1 - N_2 = 0.112$ | | where $r_i$ represents the curvature radius of the ith lens surface as counted from the object side, $d_i$ represents the axial thickness or the axial air space between the ith lens surface and the i+1th lens surface, $N_i$ represents the refractive index of the ith lens, and $\nu_i$ represents the dispersion value of the ith lens.

4. A copying lens system according to claim 1, satisfying the following data:

| | | |
|---|---|---|
| $r_1 = -r_8 = 0.34435$ | | $d_1 = d_7 = 0.0550$ |
| $r_2 = -r_7 = -1.07109$ | | $d_2 = d_6 = 0.0181$ |
| $r_3 = -r_6 = -0.52128$ | | $d_3 = d_5 = 0.0260$ |
| $r_4 = -r_5 = 0.42581$ | | $d_4 = 0.0183$ |
| $N_1 = N_4 = 1.726$ | $\nu_1 = \nu_4 = 53.5$ | $f_1 = 0.365$ |
| | | $f_2 = -0.399$ |
| $N_2 = N_3 = 1.58144$ | $\nu_2 = \nu_3 = 40.7$ | $r_2/r_3 = 2.055$ |
| | | $N_1 - N_2 = 0.145$ | where $r_i$ represents the curvature radius of the ith lens surface as counted from the object side, $d_i$ represents the axial thickness or the axial air space between the ith lens surface and the i+1th lens surface, $N_i$ represents the refractive index of the ith lens, and $\nu_i$ represents the dispersion value of the ith lens.

5. A copying lens system according to claim 1, satisfying the following data:

| | | |
|---|---|---|
| $r_1 = -r_8 = 0.29039$ | | $d_1 = d_7 = 0.0544$ |
| $r_2 = -r_7 = -0.76262$ | | $d_2 = d_6 = 0.0233$ |
| $r_3 = -r_6 = -0.40310$ | | $d_3 = d_5 = 0.0051$ |
| $r_4 = -r_5 = 0.41535$ | | $d_4 = 0.0377$ |
| $N_1 = N_4 = 1.6485$ | $\nu_1 = \nu_4 = 53.$ | $f_1 = 0.331$ |
| | | $f_2 = -0.351$ |
| $N_2 = N_3 = 1.58144$ | $\nu_2 = \nu_3 = 40.7$ | $r_2/r_3 = 1.892$ |
| | | $N_1 - N_2 = 0.067$ | where $r_i$ represents the curvature radius of the ith lens surface as counted from the object side, $d_i$ represents the axial thickness or the axial air space between the ith lens surface and the i+1th lens surface, $N_i$ represents the refractive index of the ith lens, and $\nu_i$ represents the dispersion value of the ith lens.

6. A copying lens system according to claim 1, satisfying the following data:

| | | |
|---|---|---|
| $r_1 = -r_8 = 0.29321$ | | $d_1 = d_7 = 0.0414$ |
| $r_2 = -r_7 = -1.03458$ | | $d_2 = d_6 = 0.0176$ |
| $r_3 = -r_6 = -0.47557$ | | $d_3 = d_5 = 0.0107$ |
| $r_4 = -r_5 = 0.36869$ | | $d_4 = 0.0285$ |
| $N_1 = N_4 = 1.691$ | $\nu_1 = \nu_4 = 54.8$ | $f_1 = 0.335$ |
| | | $f_2 = -0.364$ |
| $N_2 = N_3 = 1.56732$ | $\nu_2 = \nu_3 = 42.8$ | $r_2/r_3 = 2.175$ |
| | | $N_1 - N_2 = 0.124$ | where $r_i$ represents the curvature radius of the ith lens surface as counted from the object side, $d_i$ represents the axial thickness or the axial air space between the ith lens surface and the i+1th lens surface, $N_i$ represents the refractive index of the ith lens, and $\nu_i$ represents the dispersion value of the ith lens.

7. A copying lens system according to claim 1, satisfying the following data:

| | | |
|---|---|---|
| $r_1 = -r_8 = 0.33271$ | | $d_1 = d_7 = 0.0548$ |
| $r_2 = -r_7 = -1.10922$ | | $d_2 = d_6 = 0.0317$ |
| $r_3 = -r_6 = -0.46931$ | | $d_3 = d_5 = 0.0075$ |
| $r_4 = -r_5 = 0.50650$ | | $d_4 = 0.0398$ |
| $N_1 = N_4 = 1.6935$ | $\nu_1 = \nu_4 = 53.2$ | $f_1 = 0.375$ |
| | | $f_2 = -0.408$ |
| $N_2 = N_3 = 1.59551$ | $\nu_2 = \nu_3 = 39.2$ | $r_2/r_3 = 2.364$ |
| | | $N_1 - N_2 = 0.098$ | where $r_i$ represents the curvature radius of the ith lens surface as counted from the object side, $d_i$ represents the axial thickness or the axial air space between the ith lens surface and the i+1th lens surface, $N_i$ represents the refractive index of the ith lens, and $\nu_i$ represents the dispersion value of the ith lens.

8. A copying lens system according to claim 1, satisfying the following data:

| | | |
|---|---|---|
| $r_1 = -r_8 = 0.30394$ | | $d_1 = d_7 = 0.0555$ |
| $r_2 = -r_7 = -0.69051$ | | $d_2 = d_6 = 0.0132$ |
| $r_3 = -r_6 = -0.44054$ | | $d_3 = d_5 = 0.0169$ |
| $r_4 = -r_5 = 0.37475$ | | $d_4 = 0.0318$ |
| $N_1 = N_4 = 1.72$ | $\nu_1 = \nu_4 = 43.7$ | $f_1 = 0.300$ |
| | | $f_2 = -0.314$ |
| $N_2 = N_3 = 1.6398$ | $\nu_2 = \nu_3 = 34.5$ | $r_2/r_3 = 1.567$ |
| | | $N_1 - N_2 = 0.080$ | where $r_i$ represents the curvature radius of the ith lens surface as counted from the object side, $d_i$ represents the axial thickness or the axial air space between the ith lens surface and the i+1th lens surface, $N_i$ represents the refractive index of the ith lens, and $\nu_i$ represents the dispersion value of the ith lens.

9. A copying lens system according to claim 1, satisfying the following data:

| | | |
|---|---|---|
| $r_1 = -r_8 = 0.31041$ | | $d_1 = d_7 = 0.0587$ |
| $r_2 = -r_7 = -0.85931$ | | $d_2 = d_6 = 0.0123$ |
| $r_3 = -r_6 = -0.49107$ | | $d_3 = d_5 = 0.0105$ |
| $r_4 = -r_5 = 0.37531$ | | $d_4 = 0.0303$ |
| $N_1 = N_4 = 1.744$ | $\nu_1 = \nu_4 = 44.7$ | $f_1 = 0.313$ |
| | | $f_2 = -0.333$ |
| $N_2 = N_3 = 1.63636$ | $\nu_2 = \nu_3 = 35.4$ | $r_2/r_3 = 1.750$ |
| | | $N_1 - N_2 = 0.108$ | where $r_i$ represents the curvature radius of the ith lens surface as counted from the object side, $d_i$ represents the axial thickness or the axial air space between the ith lens surface and the i+1th lens surface, $N_i$ represents the refractive index of the ith lens, and $\nu_i$ represents the dispersion value of the ith lens.

* * * * *